United States Patent
Shi et al.

(10) Patent No.: US 10,873,886 B2
(45) Date of Patent: Dec. 22, 2020

(54) MOBILE EDGE PLATFORM SWITCHING METHOD, APPARATUS, AND SYSTEM

(71) Applicant: HUAWEI TECHNOLOGIES CO., LTD., Guangdong (CN)

(72) Inventors: Xiaoyan Shi, Shenzhen (CN); Chunshan Xiong, Beijing (CN); Qianghua Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/988,006

(22) Filed: May 24, 2018

(65) Prior Publication Data

US 2018/0270720 A1    Sep. 20, 2018

Related U.S. Application Data

(63) Continuation of application No. PCT/CN2015/096037, filed on Nov. 30, 2015.

(51) Int. Cl.
*H04W 36/06* (2009.01)
*H04L 12/28* (2006.01)
(Continued)

(52) U.S. Cl.
CPC ............ *H04W 36/06* (2013.01); *H04L 12/28* (2013.01); *H04W 8/24* (2013.01);
(Continued)

(58) Field of Classification Search
CPC ....... H04W 36/06; H04W 40/36; H04W 8/24; H04W 36/26; H04W 36/0033;
(Continued)

(56) References Cited

U.S. PATENT DOCUMENTS 9,338,687 B2 *  5/2016  Dahod ............... H04L 47/2458
9,668,293 B2 *  5/2017  Mihaly ................ H04W 76/22
(Continued)

FOREIGN PATENT DOCUMENTS

CN    103430516 A    12/2013
CN    104137504 A    11/2014
(Continued)

OTHER PUBLICATIONS

XP014250180 Fabio Giust, "MEC Mobility Management",NEC Europe Ltd,dated Jul. 14, 2015,total 10 pages.
(Continued)

*Primary Examiner* — Ian N Moore
*Assistant Examiner* — Rushil Parimal Sampat
(74) *Attorney, Agent, or Firm* — Fish & Richardson P.C.

(57) ABSTRACT

The present disclosure relates to a mobile edge platform switching method. In one example method, an application identity of a source application instance is received by a second mobile edge platform from a first mobile edge platform. The first mobile edge platform provides a service for the source application instance. The source application instance provides a service for a user equipment. A target application instance of the user equipment is determined based on the application identity. The application identity of the source application instance is the same as an application identity of the target application instance. The second mobile edge platform provides a service for the target application instance. A switching notification message is sent by the second mobile edge platform to the target application instance. The switching notification message is used to instruct the target application instance to provide a service for the user equipment.

9 Claims, 7 Drawing Sheets

(51) Int. Cl.
*H04W 36/00* (2009.01)
*H04W 8/24* (2009.01)
*H04W 36/26* (2009.01)
*H04W 36/30* (2009.01)
*H04W 40/36* (2009.01)
*H04W 88/18* (2009.01)

(52) U.S. Cl.
CPC .... *H04W 36/0011* (2013.01); *H04W 36/0033* (2013.01); *H04W 36/26* (2013.01); *H04W 36/30* (2013.01); *H04W 40/36* (2013.01); *H04W 88/18* (2013.01)

(58) Field of Classification Search
CPC . H04W 36/30; H04W 36/0011; H04W 88/18; H04L 12/28
See application file for complete search history.

(56) References Cited

U.S. PATENT DOCUMENTS

| | | | |
|---|---|---|---|
| 10,419,983 B2* | 9/2019 | Zhu | H04W 76/12 |
| 2003/0058874 A1 | 3/2003 | Sahaya et al. | |
| 2005/0037758 A1 | 2/2005 | Rimoni | |
| 2015/0016418 A1 | 1/2015 | Thiebaut et al. | |
| 2015/0365819 A1 | 12/2015 | Zhu et al. | |
| 2018/0077294 A1* | 3/2018 | Rasanen | H04L 12/1407 |

FOREIGN PATENT DOCUMENTS

| | | | |
|---|---|---|---|
| EP | 2836015 A1 | 2/2015 | |
| RU | 2380859 C2 | 1/2010 | |
| WO | 03026319 A2 | 3/2003 | |
| WO | 2015099587 A1 | 11/2013 | |

OTHER PUBLICATIONS

XP014250312 Draft ETSI GS MEC 002 V0.4.2(Jul. 2015),Mobile-Edge Computing (MEC);Technical Requirements,total 42 pages.
Extended European Search Report issued in European Application No. 15909477.0 dated Aug. 21, 2018, 5 pages.
Russian Office Action issued in Russian Application No. 2018123325/08(036954) dated Mar. 6, 2019, 7 pages.
Russian Search Report issued in Russian Application No. 2018123325 dated Mar. 6, 2019, 4 pages.
International Search Report issued in International Application No. PCT/CN2015/096037 dated Aug. 11, 2016, 11 pages.

* cited by examiner

MOBILE EDGE PLATFORM SWITCHING METHOD, APPARATUS, AND SYSTEM

CROSS-REFERENCE TO RELATED APPLICATIONS

This application is a continuation of International Application No. PCT/CN2015/096037, filed on Nov. 30, 2015, the disclosure of which is hereby incorporated by reference in its entirety.

TECHNICAL FIELD

Embodiments of the present disclosure relate to the communications field, and more specifically, to a mobile edge platform switching method, apparatus, and system in the communications field.

BACKGROUND

Mobile edge computing (MEC) provides an Internet (IT) service environment and a cloud computing capability on a radio access network (RAN) close to a mobile user. A mobile edge computing server (MEC Server) includes three parts: a bottom-layer infrastructure, a middle-layer mobile edge computing platform (MEC platform), and an upper-layer application (APP). The mobile edge computing platform is referred to as "mobile edge platform". The application herein is actually an application instance. Different application instances are separately deployed on different virtual machines (VM). The VM provides an implementation environment for the application instance. The mobile edge platform is a core of the MEC, and can provide modules such as a traffic offload function (TOF), a radio network information service (RNIS), a communication service, a service registry, and the like, so that the mobile edge platform can provide a service for the upper-layer application instance by using these modules.

The MEC platform is mainly used to provide optimum service experience. However, when user equipment (UE) performs, on a communications network, access network device switching, service performance on the MEC platform may be affected. For example, a service of a source MEC may not meet a user quality of service (QoS) requirement due to movement of the UE.

SUMMARY

In view of the above, embodiments of the present disclosure provide a mobile edge platform switching method, apparatus, and system, to resolve a problem that service quality does not meet a requirement when user equipment performs access network device switching, so as to ensure service continuity of the user equipment and improve user experience.

According to a first aspect, a mobile edge platform switching method is provided, including: receiving, by a second mobile edge platform, an application identity of a source application instance from a first mobile edge platform, where the first mobile edge platform provides a service for the source application instance, and the source application instance provides a service for user equipment; determining, by the second mobile edge platform, a target application instance of the user equipment based on the application identity, where the application identity of the source application instance is the same as an application identity of the target application instance, and the second mobile edge platform provides a service for the target application instance; and sending, by the second mobile edge platform, a switching notification message to the target application instance, where the switching notification message is used to instruct the target application instance to provide a service for the user equipment.

In the mobile edge platform switching method in this embodiment of the present disclosure, the second mobile edge platform receives the application identity from the first mobile edge platform, then determines, based on the application identity from an application instance controlled and managed by the second mobile edge platform, the target application instance corresponding to the application identity, and sends the switching notification message to the target application instance. This resolves a problem that service quality may not meet a requirement when the user equipment performs access network device switching, so that the second mobile edge platform can provide a low-latency and high-bandwidth service for the user equipment by using the target application instance.

In a first possible implementation of the first aspect, before the receiving, by the second mobile edge platform, the application identity from the first mobile edge platform, the method further includes: determining, by the second mobile edge platform, that the user equipment needs to perform mobile edge platform switching; and sending, by the second mobile edge platform, a switching trigger message to the first mobile edge platform, where the switching trigger message carries information about the source application instance; and the receiving, by the second mobile edge platform, the application identity from the first mobile edge platform includes: receiving, by the second mobile edge platform, the application identity from the first mobile edge platform based on the switching trigger message.

With reference to the foregoing possible implementation of the first aspect, in a second possible implementation of the first aspect, the second mobile edge platform obtains an uplink data packet of the user equipment; and when the uplink data packet is sent to the source application instance by the user equipment, the second mobile edge platform determines that the user equipment needs to perform mobile edge platform switching.

With reference to the foregoing possible implementation of the first aspect, in a third possible implementation of the first aspect, the determining, by the second mobile edge platform, that the user equipment needs to perform mobile edge platform switching includes: obtaining, by the second mobile edge platform, an uplink data packet of the user equipment; when the uplink data packet is sent to the source application instance by the user equipment, obtaining, by the second mobile edge platform, information about the user equipment from the uplink data packet; determining, by the second mobile edge platform based on the information about the user equipment, current service quality of the service provided by the source application instance for the user equipment; and when the current service quality does not meet a service quality requirement of the user equipment, determining, by the second mobile edge platform, that the user equipment needs to perform mobile edge platform switching.

With reference to the foregoing possible implementation of the first aspect, in a fourth possible implementation of the first aspect, the first mobile edge platform is connected to a first access network device, the second mobile edge platform is connected to a second access network device, the uplink data packet obtained by the second mobile edge platform is forwarded by the second access network device, and the user equipment has been switched from the first access network device to the second access network device.

With reference to the foregoing possible implementation of the first aspect, in a fifth possible implementation of the first aspect, the receiving, by the second mobile edge platform, the application identity from the first mobile edge platform includes: receiving, by the second mobile edge platform, a switching request message from the first mobile edge platform, where the switching request message carries the application identity.

With reference to the foregoing possible implementations of the first aspect, in a sixth possible implementation of the first aspect, the switching notification message includes the information about the source application instance and the information about the user equipment.

In this way, the target application instance can determine the source application instance and the user equipment based on the switching notification message, and synchronize context information of the user equipment with the source application instance. This ensures service continuity of the user equipment.

With reference to the foregoing possible implementation of the first aspect, in a seventh possible implementation of the first aspect, the information about the source application instance is an Internet Protocol IP address of the source application instance, and the information about the user equipment is an IP address of the user equipment.

With reference to the foregoing possible implementations of the first aspect, in an eighth possible implementation of the first aspect, after the sending, by the second mobile edge platform, the switching notification message to the target application instance, the method further includes: receiving, by the second mobile edge platform, a switching notification response message from the target application instance; and updating, by the second mobile edge platform, a route rule of the user equipment based on the switching notification response message, so that the uplink data packet of the user equipment is routed to the target application instance.

With reference to the foregoing possible implementation of the first aspect, in a ninth possible implementation of the first aspect, after the updating, by the second mobile edge platform, the route rule of the user equipment based on the switching notification response message, the method further includes: sending, by the second mobile edge platform, a route rule update indication message to the first mobile edge platform, where the route rule update indication message is used to instruct the first mobile edge platform to delete a route rule of the user equipment stored by the first mobile edge platform.

According to a second aspect, another mobile edge platform switching method is provided, including: determining, by a first mobile edge platform, an application identity of a source application instance, where the first mobile edge platform provides a service for the source application instance, and the source application instance provides a service for user equipment; and sending, by the first mobile edge platform, the application identity to a second mobile edge platform, where the application identity is used by the second mobile edge platform to determine a target application instance of the user equipment, and the second mobile edge platform provides a service for the target application instance.

In a first possible implementation of the second aspect, before the determining, by the first mobile edge platform, the application identity, the method further includes: determining, by the first mobile edge platform, that the user equipment needs to perform mobile edge platform switching; and the sending, by the first mobile edge platform, the application identity to the second mobile edge platform includes: sending, by the first mobile edge platform, a switching request message to the second mobile edge platform, where the switching request message carries the application identity.

With reference to the foregoing possible implementation of the second aspect, in a second possible implementation of the second aspect, the determining, by the first mobile edge platform, that the user equipment needs to perform mobile edge platform switching includes: obtaining, by the first mobile edge platform, an uplink data packet of the user equipment; and when the uplink data packet is forwarded by the second mobile edge platform, determining, by the first mobile edge platform, that the user equipment needs to perform mobile edge platform switching.

With reference to the foregoing possible implementation of the second aspect, in a third possible implementation of the second aspect, the determining, by the first mobile edge platform, that the user equipment needs to perform mobile edge platform switching includes: obtaining, by the first mobile edge platform, an uplink data packet of the user equipment; when the uplink data packet is forwarded by the second mobile edge platform, obtaining, by the first mobile edge platform, information about the user equipment from the uplink data packet; determining, by the first mobile edge platform based on the information about the user equipment, current service quality of the service provided by the source application instance for the user equipment; and when the current service quality does not meet a service quality requirement of the user equipment, determining, by the first mobile edge platform, that the user equipment needs to perform mobile edge platform switching.

With reference to the foregoing possible implementation of the second aspect, in a fourth possible implementation of the second aspect, the first mobile edge platform is connected to a first access network device, the second mobile edge platform is connected to a second access network device, the uplink data packet obtained by the first mobile edge platform is forwarded to the second mobile edge platform by the second access network device, and then is forwarded to the first mobile edge platform by the second mobile edge platform, and the user equipment has been switched from the first access network device to the second access network device.

With reference to the foregoing possible implementation of the second aspect, in a fifth possible implementation of the second aspect, before the determining, by the first mobile edge platform, the application identity, the method further includes: receiving, by the first mobile edge platform, a switching trigger message from the second mobile edge platform, where the switching trigger message carries information about the source application instance; and the determining, by the first mobile edge platform, the application identity includes: determining, by the first mobile edge platform, the application identity based on the switching trigger message.

With reference to the foregoing possible implementation of the second aspect, in a sixth possible implementation of the second aspect, the information about the source application instance is an IP address of the source application instance.

With reference to the foregoing possible implementations of the second aspect, in a seventh possible implementation of the second aspect, after the sending, by the first mobile edge platform, the application identity to the second mobile edge platform, the method further includes: deleting, by the first mobile edge platform, a route rule of the user equipment stored by the first mobile edge platform.

With reference to the foregoing possible implementation of the second aspect, in an eighth possible implementation of the second aspect, the method further includes: receiving, by the first mobile edge platform, a route rule update indication message sent by the second mobile edge platform or the source application instance; and the deleting, by the first mobile edge platform, the route rule of the user equipment stored by the first mobile edge platform includes: deleting, by the first mobile edge platform based on the route rule update indication message, the route rule of the user equipment stored by the first mobile edge platform.

According to a third aspect, still another mobile edge platform switching method is provided, including: receiving, by a target application instance, a switching notification message from a second mobile edge platform, where the switching notification message is used to instruct the target application instance to provide a service for user equipment, and the second mobile edge platform provides a service for the target application instance; and sending, by the target application instance, a synchronization request message to a source application instance based on the switching notification message, where the synchronization request message is used to request the source application instance to send context information of the user equipment to the target application instance.

In a first possible implementation of the third aspect, the switching notification message includes information about the source application instance and information about the user equipment.

With reference to the foregoing possible implementation of the third aspect, in a second possible implementation of the third aspect, the information about the source application instance is an IP address of the source application instance, and the information about the user equipment is an IP address of the user equipment.

With reference to the foregoing possible implementations of the third aspect, in a third possible implementation of the third aspect, after the target application instance synchronizes the context information of the user equipment with the source application instance based on the switching notification message, the method further includes: sending, by the target application instance, a switching notification response message to the second mobile edge platform, where the switching notification response message is used to indicate that the target application instance and the source application instance successfully synchronize the context information of the user equipment.

According to a fourth aspect, a mobile edge platform switching apparatus is provided, configured to perform the method in the first aspect or any possible implementation of the first aspect. Specifically, the apparatus includes units for performing the method in the first aspect or any possible implementation of the first aspect.

According to a fifth aspect, a mobile edge platform switching apparatus is provided, configured to perform the method in the second aspect or any possible implementation of the second aspect. Specifically, the apparatus includes units for performing the method in the second aspect or any possible implementation of the second aspect.

According to a sixth aspect, a mobile edge platform switching apparatus is provided, configured to perform the method in the third aspect or any possible implementation of the third aspect. Specifically, the apparatus includes units for performing the method in the third aspect or any possible implementation of the third aspect.

According to a seventh aspect, a mobile edge platform switching apparatus is provided, and the apparatus includes a receiver, a transmitter, a memory, a processor, and a bus system. The receiver, the transmitter, the memory, and the processor are connected by using the bus system. The memory is configured to store an instruction, and the processor is configured to execute the instruction stored in the memory, to control the receiver to receive a signal and control the transmitter to send a signal. When the processor executes the instruction stored in the memory, the execution enables the processor to perform the method in the first aspect or any possible implementation of the first aspect.

According to an eighth aspect, a mobile edge platform switching apparatus is provided, and the apparatus includes a receiver, a transmitter, a memory, a processor, and a bus system. The receiver, the transmitter, the memory, and the processor are connected by using the bus system. The memory is configured to store an instruction, and the processor is configured to execute the instruction stored in the memory, to control the receiver to receive a signal and control the transmitter to send a signal. When the processor executes the instruction stored in the memory, the execution enables the processor to perform the method in the second aspect or any possible implementation of the second aspect.

According to a ninth aspect, a mobile edge platform switching apparatus is provided, and the apparatus includes a receiver, a transmitter, a memory, a processor, and a bus system. The receiver, the transmitter, the memory, and the processor are connected by using the bus system. The memory is configured to store an instruction, and the processor is configured to execute the instruction stored in the memory, to control the receiver to receive a signal and control the transmitter to send a signal. When the processor executes the instruction stored in the memory, the execution enables the processor to perform the method in the third aspect or any possible implementation of the third aspect.

According to a tenth aspect, a mobile edge platform switching system is provided, and the system includes any apparatus in the fourth aspect and the sixth aspect.

According to an eleventh aspect, a computer readable medium storing a computer program is provided, and the computer program includes an instruction for performing the method in the first aspect or any possible implementation of the first aspect.

According to a twelfth aspect, a computer readable medium storing a computer program is provided, and the computer program includes an instruction for performing the method in the second aspect or any possible implementation of the second aspect.

According to a thirteenth aspect, a computer readable medium storing a computer program is provided, and the computer program includes an instruction for performing the method in the third aspect or any possible implementation of the third aspect.

BRIEF DESCRIPTION OF DRAWINGS

To describe the technical solutions in some embodiments of the present disclosure more clearly, the following briefly describes the accompanying drawings for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
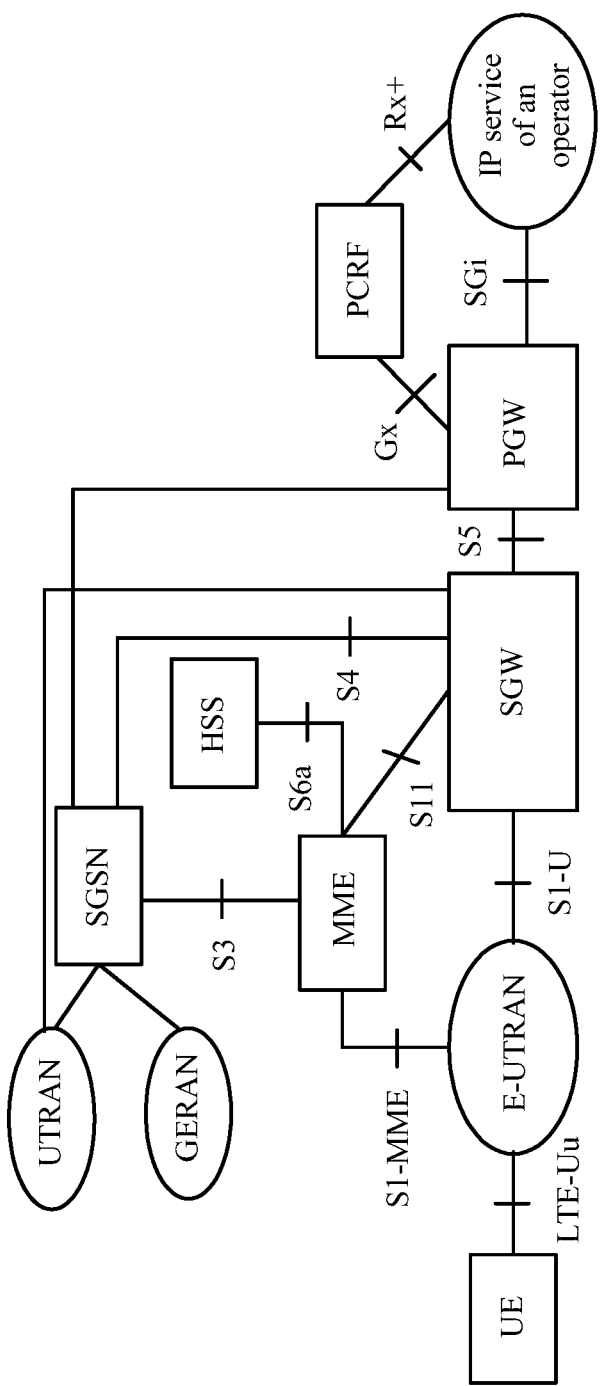
FIG. 1 is a schematic diagram of an application scenario according to an embodiment of the present disclosure.

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTSrt), a Worldwide Interoperability for Microwave Access (WiMAX) communications system, a future possible communications system, and the like.

It should also be understood that in the embodiments of the present disclosure, user equipment (UE) may be referred to as a terminal, a mobile station (MS), a mobile terminal, or the like. The user equipment may bidirectionally communicate with one or more core networks through a radio access network (RAN). For example, the user equipment may be a mobile phone (or referred to as a "cellular" phone) or a computer with a mobile terminal. For example, the user equipment may be alternatively a portable, pocket-sized, handheld, computer built-in, or in-vehicle mobile apparatus, which exchanges voice and/or data with the radio access network.

In the embodiments of the present disclosure, an access network device may be a base station controller (BSC) in GSM or CDMA, or may be a radio node controller (RNC) in WCDMA, or may be an evolved NodeB (eNB or e-NodeB) in LTE. This is not limited in the present disclosure. However, for ease of description, the following embodiments are described by using an eNB as an example.

Mobile edge computing (MEC) provides a big data service, an Internet of Things service, and a data service at a mobile network edge. In addition, an application programming interface (API) is enabled for a third party to rapidly deploy a new service. A mobile edge computing server mainly includes three parts: a bottom-layer infrastructure, a middle-layer mobile edge computing platform, and an upper-layer application. The mobile edge computing platform is short for "mobile edge platform". The application herein is actually an application instance. Different application instances are separately deployed on different virtual machines (VM). The VM provides an implementation environment for the application instance. The mobile edge platform is a core of the MEC, and can provide a traffic offload function (TOF), a radio network information service (RNIS), a communication service, a service registry, and other modules, so that the mobile edge platform can provide a service for the upper-layer application instance by using these modules.

Therefore, it can be learned that a MEC network element is mainly located on a radio access network side, and is close to a mobile user and radio network information. This provides a natural location advantage, so that the MEC network element can provide a low-latency, rapid-access, and high-bandwidth localized innovative service.

FIG. 1 is a schematic architecture diagram of an application scenario according to an embodiment of the present disclosure. As shown in FIG. 1, a radio network architecture of a 3GPP evolved packet system (EPS) may include: UE, an evolved UMTS terrestrial radio access network (E-UTRAN, where Universal Mobile Telecommunications System is short for "UMTS"), a mobility management entity (MME), a serving gateway (SGW), a packet data network gateway (PGW), a policy and charging rules function (PCRF), a home subscriber server (HSS), a serving general packet radio service supporting node (SGSN), a UMTS terrestrial radio access network (UTRAN), a GSM/EDGE radio access network (GERAN, where Enhanced Data rates for GSM Evolution (Enhanced Data Rates for GSM Evolution) is short for "EDGE"), and the like.

The MME is mainly responsible for all control plane functions of user session management, such as non-access stratum (NAS) signaling encryption and integrity protection, tracking area list management, and PGW and SGW selection. In addition, when UE is in an idle state, the MME may store and carry context information. The SGW is mainly responsible for data transmission, forwarding, route switching, and the like of user equipment, and can be used as a local mobility anchor during switching between eNBs for the user equipment (for each user equipment, only one SGW serves the user equipment at each time point). The PGW is a gateway for connecting a packet data network (PDN) that provides a service, is an anchor for the PDN connection, and is responsible for IP address assignment of the user equipment, and data packet filtering, rate control, charging information generation, and the like of the user equipment.

Figure 2:
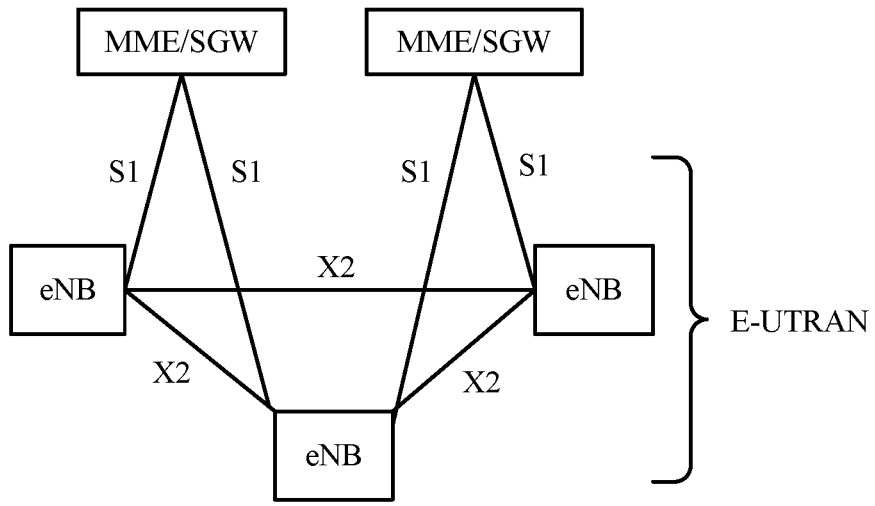
FIG. 2 is a schematic diagram of an E-UTRAN architecture.

Specifically, as shown in FIG. 2, an E-UTRAN architecture is mainly a network including a plurality of eNBs. The E-UTRAN architecture can implement a radio physical layer function, a resource scheduling function, a radio resource management function, a radio access control function, and a mobility management function. eNBs may be interconnected by using an X2 interface, and may transmit data in an X2-based switching process. An eNB is connected to the SGW by using a user plane interface S1-U, and uses a GPRS Tunneling Protocol-User Plane (GTP-U, where general packet radio system is short for GPRS) to transport user data. The eNB is connected to the MME by using a control plane interface S1-MME, and implements a function such as radio access bearer control by using the S1-AP protocol. The MEC is mainly located on an S1-U interface in FIG. 1. The MEC can process only user plane data in the EPS system. An upper-layer node of the MEC is the SGW, and a lower-layer node of the MEC is the eNB.

It should be understood that application in the EPS system is used as an example for description in the embodiments of the present disclosure, but the present disclosure is not limited thereto. In addition, the terms "system" and "network" may be usually used interchangeably in this specification.

Figure 3:
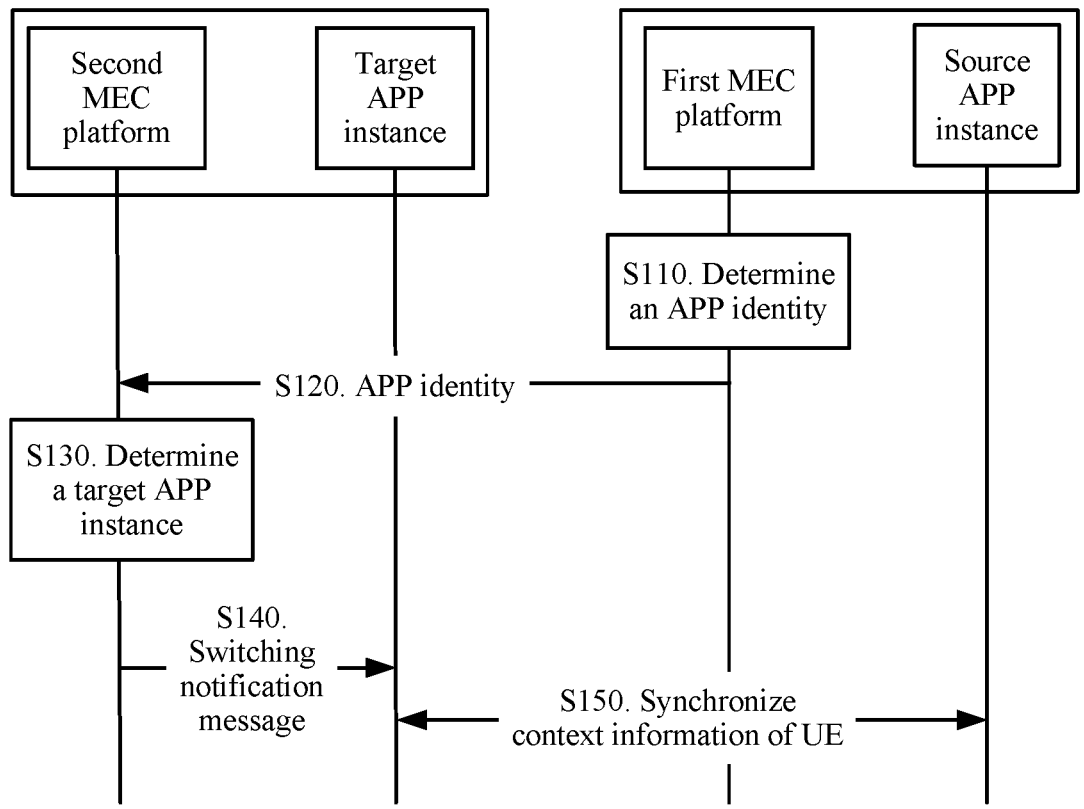
FIG. 3 is a schematic flowchart of a mobile edge platform switching method according to an embodiment of the present disclosure.

FIG. 3 is a schematic flowchart of a mobile edge platform switching method 100 according to an embodiment of the present disclosure. The method 100 is used to switch UE from a first mobile edge platform to a second mobile edge platform, so that the UE is switched from a source application instance corresponding to the first mobile edge platform to a target application instance corresponding to the second mobile edge platform. The method 100 may be applied to the EPS radio network system shown in FIG. 1, but this embodiment of the present disclosure is not limited thereto. As shown in FIG. 3, the method 100 includes the following steps.

S110. The first mobile edge platform determines an application identity of the source application instance, where the first mobile edge platform provides a service for the source application instance, and the source application instance provides a service for the user equipment.

Herein, it should be understood that the source application instance and the target application instance are two different copies of a same application, and the application identity is used to uniquely identify the application. Therefore, the source application instance and the target application instance are corresponding to a same application identity. Different application instances may be separately deployed on different mobile edge platforms, and provide services for the user equipment by using corresponding mobile edge platforms.

S120. The first mobile edge platform sends the application identity to the second mobile edge platform, where the second mobile edge platform provides a service for the target application instance.

S130. The second mobile edge platform receives the application identity sent by the first mobile edge platform, and determines the target application instance of the user equipment based on the application identity.

S140. The second mobile edge platform sends a switching notification message to the target application instance, where the switching notification message is used to instruct the target application instance to provide a service for the user equipment.

In actual application, different application instances may be separately deployed on different virtual machines, and the virtual machine provides an implementation environment for the application instance. Therefore, that the second mobile edge platform sends a switching notification message to the target application instance may be actually that the second mobile edge platform sends the switching notification message to a virtual machine corresponding to the target application instance.

S150. The target application instance receives the switching notification message sent by the second mobile edge platform, and sends a synchronization request message to the source application instance based on the switching notification message, where the synchronization request message is used to request the source application instance to send context information of the user equipment to the target application instance.

Herein, the target application instance may send the synchronization request message to the source application instance, the source application instance sends the context information of the user equipment to the target application instance based on the received synchronization request message, and the target application instance receives the context information. In this way, the target application instance and the source application instance successfully synchronize the context information of the user equipment.

Specifically, for example, after a mobile edge platform is deployed in the EPS system, when the user equipment performs 3GPP switching, a service on a source mobile edge platform does not meet a service quality requirement of a user due to movement of the user equipment. Consequently, user experience is inevitably affected, and existence value of the mobile edge platform is reduced. Therefore, the user equipment needs to switch the service from the source mobile edge platform to a target mobile edge platform.

The mobile edge platform provides a service for an application instance specifically by controlling and managing a service module used by the application instance, so as to provide corresponding service support for the user equipment by using the application instance. A same service of the user equipment, for example, an application, has different copies on different mobile edge platforms. In this embodiment of the present disclosure, the source application instance and the target application instance may be two different application instance copies of a same application. Therefore, the source application instance and the target application instance have a same and unique application identity. An application instance corresponding to the application identity may be determined from a plurality of application instances of the mobile edge platform based on the application identity.

In the mobile edge platform switching method in this embodiment of the present disclosure, the first mobile edge platform determines the application identity, and sends the application identity to the second mobile edge platform. The second mobile edge platform receives the application identity, determines, based on the application identity from an application instance controlled and managed by the second mobile edge platform, the target application instance corresponding to the application identity, and sends the switching notification message to the target application instance. After receiving the switching notification message, the target application instance synchronizes the context information of the user equipment with the source application instance based on the switching notification message, so that the second mobile edge platform can provide a low-latency and high-bandwidth service for the user equipment by using the target application instance. This ensures service continuity of the user equipment and improves user experience.

In an optional embodiment, the switching notification message may include information about the source application instance and information about the user equipment. Further, the information about the source application instance may be an Internet Protocol (Internet Protocol, "IP" for short) address of the source application instance, and the information about the user equipment may be an IP address of the user equipment.

It should be understood that, the information about the source application instance may be the IP address of the source application instance, or may be other information. For example, when a special transmission mechanism is used for data forwarding of the user equipment, for example, when the GTP-U protocol or the Generic Routing Encapsulation (GRE) protocol is used for data transmission, the information about the source application instance may be a Generic Routing Encapsulation key (GRE Key) or a tunnel endpoint identifier (TEID). This is not limited in this embodiment of the present disclosure.

It should also be understood that, the information about the user equipment may be the IP address of the user equipment, and in some special cases, the information may be a user name registered with the source application instance by using the user equipment by a user, such as a WeChat ID, a QQ number, or a Youku user name, and the information requires a special application for support. In this embodiment of the present disclosure, the mobile edge platform may determine, based on the application identity, to use a specific type of information about the user equipment. In addition, the information about the user equipment may be alternatively an international mobile subscriber identity (IMSI) or a mobile subscriber international number (MSISDN, where integrated services digital network is short for "ISDN", and public switched telephone network is short for "PSTN"). This is not limited either in this embodiment of the present disclosure.

The second mobile edge platform may obtain the information about the source application instance and the information about the user equipment in a plurality of manners. Optionally, the information about the source application instance and the information about the user equipment may be sent to the second mobile edge platform by the first mobile edge platform, or may be determined by the second mobile edge platform based on a received uplink data packet. This is not limited in this embodiment of the present disclosure.

In an optional embodiment, before S110, that is, before the first mobile edge platform determines the application identity, the method further includes:

the first mobile edge platform determines that the user equipment needs to perform mobile edge platform switching.

That the first mobile edge platform sends the application identity to the second mobile edge platform in S120 includes:

the first mobile edge platform sends a switching request message to the second mobile edge platform, where the switching request message carries the application identity.

That the second mobile edge platform receives the application identity sent by the first mobile edge platform in S130 includes:

the second mobile edge platform receives the switching request message sent by the first mobile edge platform, where the switching request message carries the application identity.

In this embodiment, the first mobile edge platform determines that the user equipment needs to perform mobile edge platform switching, and sends, to the second mobile edge platform, the switching request message that carries the application identity. The second mobile edge platform receives the switching request message that carries the application identity and that is sent by the first mobile edge platform, and can complete subsequent mobile edge platform switching based on the switching request message. Optionally, in addition to the application identity, the switching request message may carry the information about the source application instance and the information about the user equipment, or other information. This is not limited in this embodiment of the present disclosure.

In this embodiment of the present disclosure, the first mobile edge platform may determine, in a plurality of manners, that the user equipment needs to perform mobile edge platform switching. In an optional embodiment, that the first mobile edge platform determines that the user equipment needs to perform mobile edge platform switching includes:

the first mobile edge platform obtains an uplink data packet of the user equipment; and if the uplink data packet is forwarded by the second mobile edge platform, the first mobile edge platform determines that the user equipment needs to perform mobile edge platform switching.

Specifically, for example, when the user equipment is in a 3GPP switching process or completes switching, a transmission path for the uplink data packet sent to the source application instance by the user equipment changes. The first mobile edge platform is connected to a first eNB, and the second mobile edge platform is connected a second eNB. Before the user equipment moves, the user equipment is close to the first mobile edge platform, the uplink data packet is sent to the first eNB by the user equipment, and the first eNB directly sends the uplink data packet to the first mobile edge platform. After the user equipment moves close to the second mobile edge platform, the uplink data packet is first sent to the second eNB by the user equipment, the second eNB sends the uplink data packet to the second mobile edge platform, and then the second mobile edge platform sends the obtained uplink data packet to the first mobile edge platform according to a route rule of the user equipment. Therefore, the first mobile edge platform may determine, based on a source of the uplink data packet, whether the user equipment needs to perform mobile edge platform switching, and the second mobile edge platform may also determine, based on the uplink data packet, whether the user equipment needs to perform mobile edge platform switching. For example, when the first mobile edge platform detects that the uplink data packet is received from the user equipment, mobile edge platform switching may not be performed; or when detecting that the uplink data packet is received from the second mobile edge platform, the first mobile edge platform may determine that mobile edge platform switching is to be performed. In this embodiment of the present disclosure, the first mobile edge platform determines, based on the uplink data packet, that the user equipment needs to perform mobile edge platform switching.

In an optional embodiment, that the first mobile edge platform determines that the user equipment needs to perform mobile edge platform switching includes:

the first mobile edge platform obtains an uplink data packet of the user equipment;

if the uplink data packet is forwarded by the second mobile edge platform, the first mobile edge platform obtains information about the user equipment from the uplink data packet;

the first mobile edge platform determines, based on the information about the user equipment, current service quality of the service provided by the source application instance for the user equipment; and when the current service quality does not meet a service quality requirement of the user equipment, the first mobile edge platform determines that the user equipment needs to perform mobile edge platform switching.

Specifically, the first mobile edge platform may first obtain the information about the user equipment from the uplink data packet. The first mobile edge platform may request, based on the information about the user equipment, a management system of a mobile edge platform for service quality obtained after the user equipment moves. If the service quality of the user equipment does not meet a requirement, the first mobile edge platform determines that the user equipment needs to perform mobile edge platform switching. This step is usually performed in a scenario such as load balance or rapid service recovery. This is not limited in this embodiment of the present disclosure.

In an optional embodiment, before S110, that is, before the first mobile edge platform determines the application identity, the method 100 further includes:

the second mobile edge platform determines that the user equipment needs to perform mobile edge platform switching;

the second mobile edge platform sends a switching trigger message to the first mobile edge platform, where the switching trigger message carries information about the source application instance; and the first mobile edge platform receives the switching trigger message sent by the second mobile edge platform.

In this case, accordingly, that the first mobile edge platform determines an application identity in S110 includes:

the first mobile edge platform determines the application identity based on the switching trigger message.

That the second mobile edge platform receives the application identity sent by the first mobile edge platform in S130 includes:

the second mobile edge platform receives the application identity sent by the first mobile edge platform based on the switching trigger message.

Herein, the information that is about the source application instance and that is carried in the switching trigger message sent by the second mobile edge platform may be the IP address of the source application instance, so that the first mobile edge platform determines, based on the IP address, the application identity corresponding to the source application instance, and then sends the application identity to the second mobile edge platform.

In this embodiment, the second mobile edge platform determines that the user equipment needs to perform mobile edge platform switching, and then sends, to the first mobile edge platform, the switching trigger message that carries the information about the source application instance. After the first mobile edge platform receives the switching trigger message that carries the information about the source application instance and that is sent by the second mobile edge platform, the first mobile edge platform may determine the application identity based on the switching trigger message, and send the application identity to the second mobile edge platform, so that the second mobile edge platform can receive the application identity sent by the first mobile edge platform, and the second mobile edge platform can complete subsequent mobile edge platform switching based on the application identity. The switching trigger message may further carry the information about the user equipment. This is not limited in this embodiment of the present disclosure.

The second mobile edge platform may determine, in a plurality of manners, that the user equipment needs to perform mobile edge platform switching. In an optional embodiment, that the second mobile edge platform determines that the user equipment needs to perform mobile edge platform switching includes:

the second mobile edge platform obtains an uplink data packet of the user equipment; and if the uplink data packet is sent to the source application instance by the user equipment, the second mobile edge platform determines that the user equipment needs to perform mobile edge platform switching.

In this embodiment of the present disclosure, for example, when the user equipment is in a 3GPP switching process or completes switching, a transmission path for the uplink data packet sent to the source application instance by the user equipment changes. The first mobile edge platform is connected to a first eNB, and the second mobile edge platform is connected a second eNB. Before the user equipment moves, the user equipment is close to the first mobile edge platform, the uplink data packet is sent to the first eNB by the user equipment, and the first eNB directly sends the uplink data packet to the first mobile edge platform. After the user equipment moves close to the second mobile edge platform, the uplink data packet is first sent to the second eNB by the user equipment, the second eNB sends the uplink data packet to the second mobile edge platform, and then the second mobile edge platform sends the obtained uplink data packet to the first mobile edge platform according to a route rule of the user equipment.

Therefore, the second mobile edge platform may determine, based on the uplink data packet sent to the source application instance by the user equipment, that the user equipment needs to perform mobile edge platform switching. Specifically, if the uplink data packet obtained by the second mobile edge platform needs to be forwarded to the first mobile edge platform according to the route rule, instead of being forwarded to a corresponding application instance on the second mobile edge platform, the second mobile edge platform may determine that the user equipment needs to perform mobile edge platform switching because an objective of this embodiment of the present disclosure is to provide optimum service experience for the user equipment as much as possible.

In an optional embodiment, that the second mobile edge platform determines that the user equipment needs to perform mobile edge platform switching includes:

the second mobile edge platform obtains an uplink data packet of the user equipment;

if the uplink data packet is sent to the source application instance by the user equipment, the second mobile edge platform obtains information about the user equipment from the uplink data packet;

the second mobile edge platform determines, based on the information about the user equipment, current service quality of the service provided by the source application instance for the user equipment; and when the current service quality does not meet a service quality requirement of the user equipment, the second mobile edge platform determines that the user equipment needs to perform mobile edge platform switching.

Specifically, the second mobile edge platform may first obtain the information about the user equipment from the uplink data packet. The second mobile edge platform may request, based on the information about the user equipment, a management system of a mobile edge platform for service quality obtained after the user equipment moves. If the service quality of the user equipment does not meet a requirement, the second mobile edge platform determines that the user equipment needs to perform mobile edge platform switching. This step is usually performed in a scenario such as load balance or rapid service recovery. This is not limited in this embodiment of the present disclosure.

Before sending the switching trigger message to the first mobile edge platform, the second mobile edge platform needs to obtain the information about the source application instance from the uplink data packet. Optionally, the second mobile edge platform may further obtain the information about the user equipment from the uplink data packet. The information about the user equipment is used by the target application instance to synchronize the context information of the user equipment with the source application instance. Therefore, the information about the user equipment can be used by the target application instance to synchronize the context information with the source application instance, provided that the information about the user equipment is obtained before the step of synchronization. This is not limited in this embodiment of the present disclosure.

In an optional embodiment, after S150, that is, after the target application instance synchronizes the context information of the user equipment with the source application instance based on the switching notification message, the method further includes:

the target application instance sends a switching notification response message to the second mobile edge platform, where the switching notification response message is used to indicate that the target application instance and the source application instance successfully synchronize the context information of the user equipment;

the second mobile edge platform receives the switching notification response message sent by the target application instance; and the second mobile edge platform updates a route rule of the user equipment based on the switching notification response message, so as to route the uplink data packet of the user equipment to the target application instance.

Specifically, after synchronizing the context information of the user equipment with the source application instance based on the switching notification message sent by the second mobile edge platform, the target application instance sends the switching notification response message to the second mobile edge platform. The second mobile edge platform receives the switching notification response message, and then may update the route rule of the user equipment based on the switching notification response message, and route the uplink data packet of the user equipment to the target application instance. In this case, mobile edge platform switching is completed.

In an optional embodiment, after the second mobile edge platform updates the route rule of the user equipment, the method further includes:

the first mobile edge platform deletes a route rule of the user equipment stored by the first mobile edge platform.

In this embodiment, after the user equipment completes mobile edge platform switching, the first mobile edge platform may delete the stored route rule of the user equipment, so as to save space resources of the first mobile edge platform.

In an optional embodiment, the method further includes:

the second mobile edge platform or the source application instance sends a route rule update indication message to the first mobile edge platform; and the first mobile edge platform receives the route rule update indication message sent by the second mobile edge platform or the source application instance.

That the first mobile edge platform deletes a route rule of the user equipment stored by the first mobile edge platform includes:

the first mobile edge platform deletes, based on the route rule update indication message, the route rule of the user equipment stored by the first mobile edge platform.

Specifically, after the second mobile edge platform completes switching, that is, after the second mobile edge platform updates the route rule of the user equipment, the second mobile edge platform may send the route rule update indication message to the first mobile edge platform, and after receiving the route rule update indication message, the first mobile edge platform may delete the stored route rule of the user equipment based on the route rule update indication message. Alternatively, after the source application instance and the target application instance synchronize the context information of the user equipment, the source application instance may send the route rule update indication message to the first mobile edge platform, and after receiving the route rule update indication message, the first mobile edge platform may delete the stored route rule of the user equipment based on the route rule update indication message. Alternatively, the first mobile edge platform may receive both the route rule update indication message sent by the second mobile edge platform and the route rule update indication message sent by the source application instance, and the first mobile edge platform may delete, based on the route rule update indication messages, the route rule of the user equipment stored by the first mobile edge platform.

It should be understood that, the EPS radio network system is merely used as an example for description in this embodiment of the present disclosure, but the present disclosure is not limited thereto. This embodiment of the present disclosure may be applied to other various communications network architectures. It should also be understood that, this embodiment of the present disclosure is merely described based on an example of 3GPP switching, but the present disclosure is not limited thereto. Mobile edge platform switching in this embodiment of the present disclosure may be applied to other scenarios.

It should also be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In the mobile edge platform switching method in this embodiment of the present disclosure, the first mobile edge platform determines the application identity, and sends the application identity to the second mobile edge platform. The second mobile edge platform receives the application identity, determines, based on the application identity from an application instance controlled and managed by the second mobile edge platform, the target application instance corresponding to the application identity, and sends the switching notification message to the target application instance. After receiving the switching notification message, the target application instance synchronizes the context information of the user equipment with the source application instance based on the switching notification message, so that the second mobile edge platform can provide a low-latency and high-bandwidth service for the user equipment by using the target application instance. This ensures service continuity of the user equipment and improves user experience.

Figure 4:
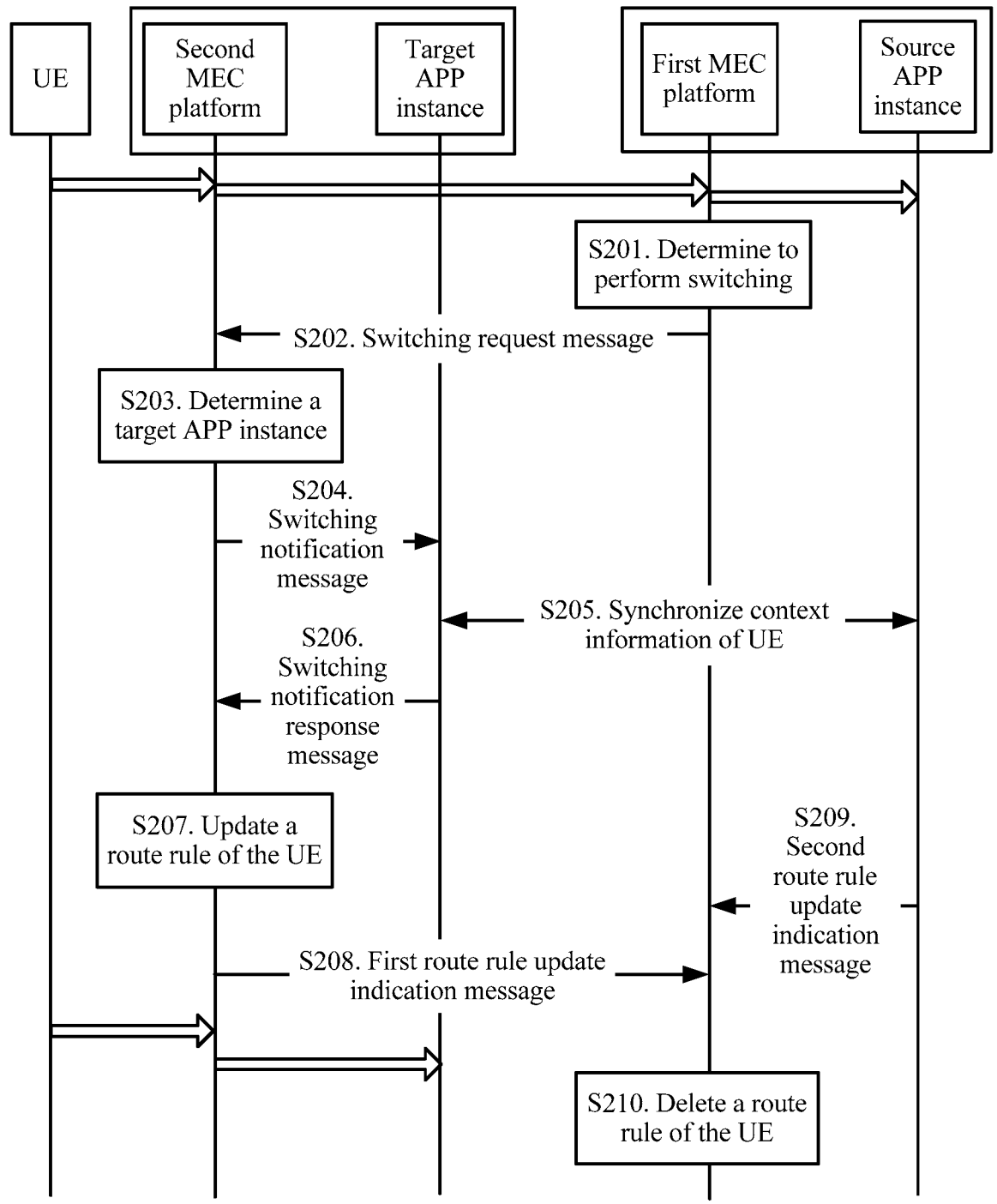
FIG. 4 is a schematic flowchart of another mobile edge platform switching method according to an embodiment of the present disclosure.

FIG. 4 is a schematic flowchart of a mobile edge platform switching method according to another embodiment of the present disclosure. In this method, that UE needs to perform mobile edge platform switching is mainly determined by a first MEC platform.

In S201, after receiving an uplink data packet of the UE forwarded by a second MEC platform, the first MEC platform determines that mobile edge platform switching is to be performed.

In S202, the first MEC platform sends a switching request message to the second MEC platform, where the switching request message carries an APP identity, an IP address of a source APP instance, and an IP address of the UE.

In S203, the second MEC platform determines a target APP instance based on the APP identity in the switching request message.

In S204, the second MEC platform sends a switching notification message to the target APP instance, to notify the target APP instance that the UE is about to switch to the second MEC platform, and the target APP instance provides a service for the UE.

In S205, after receiving the switching notification message, the target APP instance synchronizes context information of the UE with the source APP instance.

In S206, after completing the synchronization of the context information of the UE, the target APP instance sends a switching notification response message to the second MEC platform.

In S207, the second MEC platform updates a route rule of the UE, so as to route the uplink data packet of the UE to the target APP instance.

In S208, after completing the update of the route rule, the second MEC platform sends a route rule update indication message to the first MEC platform.

In S209, after the source APP instance and the target APP instance synchronize the context information of the UE, the source APP instance sends a route rule update indication message to the first MEC platform.

In S210, the first MEC platform deletes, based on the route rule update indication messages sent by the second MEC platform and the source APP instance, a route rule of the UE stored by the first MEC platform.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In the mobile edge platform switching method in this embodiment of the present disclosure, the first mobile edge platform determines that mobile edge platform switching is to be performed, and sends, to the second mobile edge platform, the switching request message that carries the application identity. The second mobile edge platform receives the switching request message; determines, from an application instance controlled and managed by the second mobile edge platform, the target application instance corresponding to the application identity in the switching request message; and sends the switching notification message to the target application instance. After receiving the switching notification message, the target application instance synchronizes the context information of the user equipment with the source application instance based on the switching notification message. In this way, the second mobile edge platform can synchronize the route rule of the user equipment with the first mobile edge platform, so that the second mobile edge platform can provide a low-latency and high-bandwidth service for the user equipment by using the target application instance. This ensures service continuity of the user equipment and improves user experience.

Figure 5:
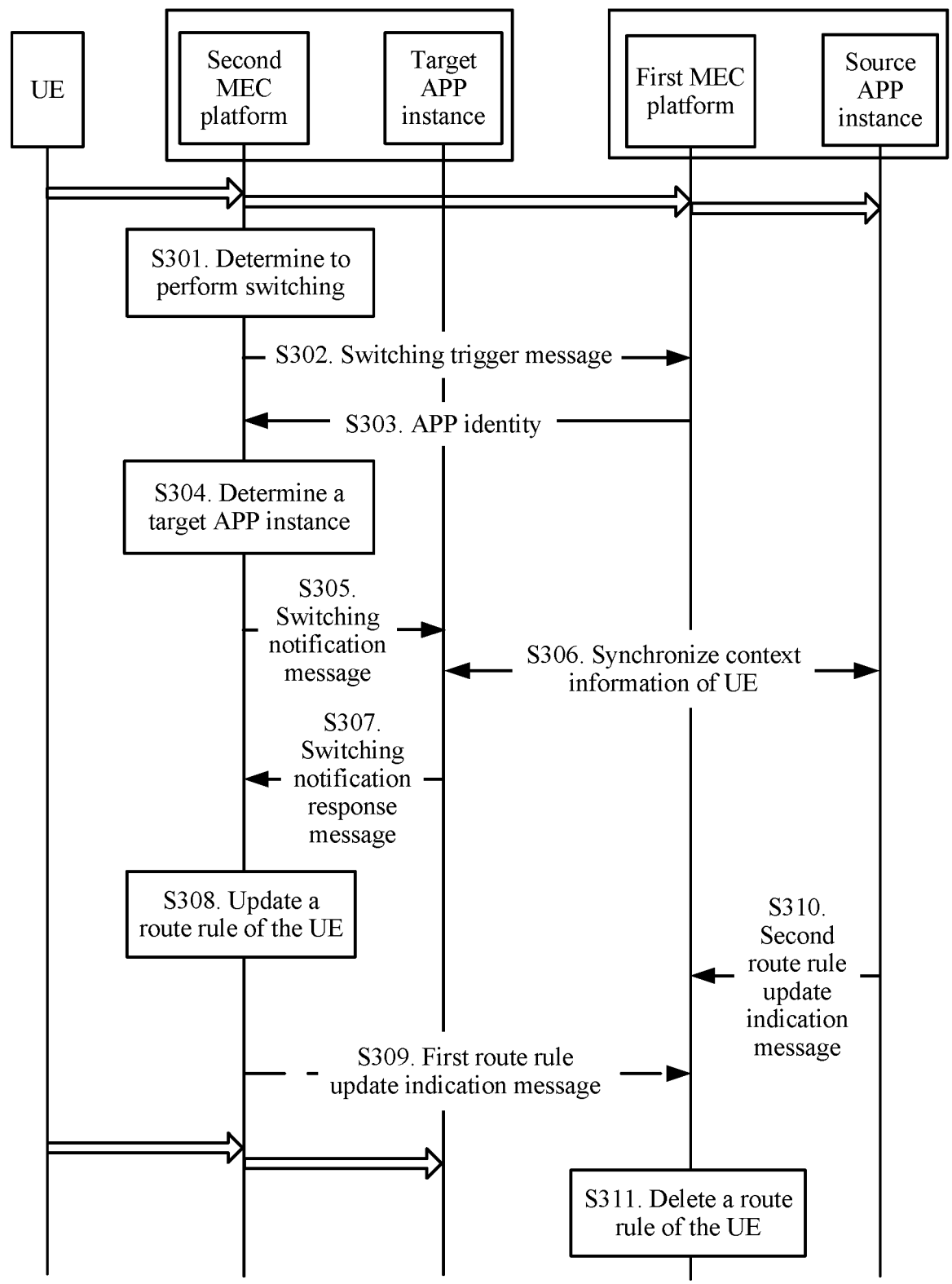
FIG. 5 is a schematic flowchart of another mobile edge platform switching method according to an embodiment of the present disclosure.

FIG. 5 is a schematic flowchart of a mobile edge platform switching method according to still another embodiment of the present disclosure. In this method, that UE needs to perform mobile edge platform switching is mainly determined by a second MEC platform.

In S301, after obtaining an uplink data packet of the UE, the second MEC platform determines that mobile edge platform switching is to be performed.

In S302, the second MEC platform sends a switching trigger message to a first MEC platform, where the switching trigger message carries an IP address of a source APP instance and an IP address of the UE.

In S303, the first MEC platform determines an APP identity based on the IP address of the source APP instance in the switching trigger message, and sends the APP identity to the second MEC platform.

In S304, the second MEC platform determines a target APP instance based on the APP identity sent by the first MEC platform.

In S305, the second MEC platform sends a switching notification message to the target APP instance, to notify the target APP instance that the UE is about to switch to the second MEC platform, and the target APP instance provides a service for the UE.

In S306, after receiving the switching notification message, the target APP instance synchronizes context information of the UE with the source APP instance.

In S307, after completing the synchronization of the context information of the UE, the target APP instance sends a switching notification response message to the second MEC platform.

In S308, the second MEC platform updates a route rule of the UE, so as to route the uplink data packet of the UE to the target APP instance.

In S309, after completing the update of the route rule, the second MEC platform sends a route rule update indication message to the first MEC platform.

In S310, after the source APP instance and the target APP instance synchronize the context information of the UE, the source APP instance sends a route rule update indication message to the first MEC platform.

In S311, the first MEC platform deletes, based on the route rule update indication messages sent by the second MEC platform and the source APP instance, a route rule of the UE stored by the first MEC platform.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In the mobile edge platform switching method in this embodiment of the present disclosure, the second mobile edge platform sends the switching trigger message to the first mobile edge platform. The first mobile edge platform determines and sends the application identity. The second mobile edge platform receives the application identity; determines, based on the application identity from an application instance controlled and managed by the second mobile edge platform, the target application instance corresponding to the application identity; and sends the switching notification message to the target application instance. After receiving the switching notification message, the target application instance synchronizes the context information of the user equipment with the source application instance based on the switching notification message. In this way, the second mobile edge platform can synchronize the route rule of the user equipment with the first mobile edge platform, so that the second mobile edge platform can provide a low-latency and high-bandwidth service for the user equipment by using the target application instance. This ensures service continuity of the user equipment and improves user experience.

Figure 6:
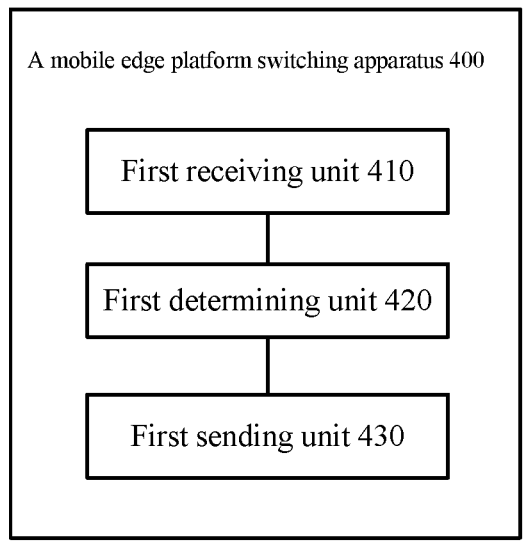
FIG. 6 is a schematic block diagram of a mobile edge platform switching apparatus according to an embodiment of the present disclosure.
Figure 7:
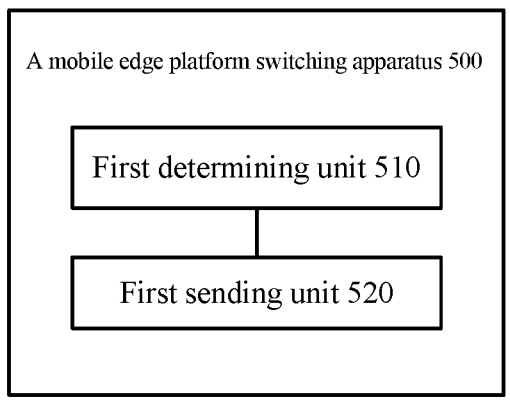
FIG. 7 is a schematic block diagram of another mobile edge platform switching apparatus according to an embodiment of the present disclosure.
Figure 8:
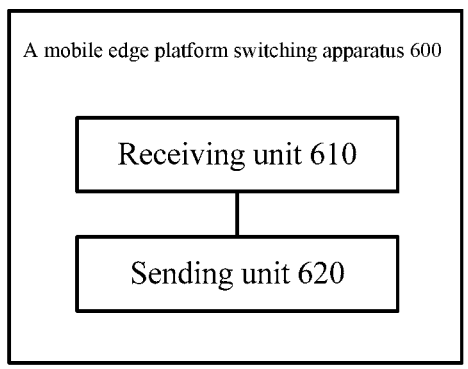
FIG. 8 is a schematic block diagram of another mobile edge platform switching apparatus according to an embodiment of the present disclosure.

With reference to FIG. 1 to FIG. 5, the mobile edge platform switching method in the embodiments of the present disclosure is described in detail above. With reference to FIG. 6 to FIG. 8, a mobile edge platform switching apparatus and system in the embodiments of the present disclosure are described in detail below.

FIG. 6 shows a mobile edge platform switching apparatus 400 according to an embodiment of the present disclosure. The apparatus 400 includes:

a first receiving unit 410, configured to receive an application identity sent by a first mobile edge platform, where the first mobile edge platform provides a service for a source application instance;

a first determining unit 420, configured to determine a target application instance based on the application identity received by the first receiving unit, where the mobile edge platform switching apparatus provides a service for the target application instance; and a first sending unit 430, configured to send a switching notification message to the target application instance determined by the first determining unit, where the switching notification message is used to notify the target application instance that user equipment needs to switch to the apparatus, and the target application instance provides a service for the user equipment.

Optionally, the switching notification message includes information about the source application instance and information about the user equipment.

Optionally, the first receiving unit is specifically configured to receive a switching request message sent by the first mobile edge platform, where the switching request message carries the application identity.

Optionally, the apparatus further includes:

a second determining unit, configured to: before the application identity sent by the first mobile edge platform is received, determine that the user equipment needs to perform mobile edge platform switching; and a second sending unit, configured to send a switching trigger message to the first mobile edge platform, where the switching trigger message carries the information about the source application instance.

The first receiving unit is specifically configured to receive the application identity sent by the first mobile edge platform based on the switching trigger message.

Optionally, the apparatus further includes:

an obtaining unit, configured to obtain an uplink data packet of the user equipment.

The second determining unit is specifically configured to: if the uplink data packet is sent to the source application instance by the user equipment, determine that the user equipment needs to perform mobile edge platform switching.

Optionally, the apparatus further includes:

an obtaining unit, configured to obtain an uplink data packet of the user equipment; and if the uplink data packet is sent to the source application instance by the user equipment, obtain the information about the user equipment from the uplink data packet.

The second determining unit is specifically configured to determine, based on the information about the user equipment, current service quality of the service provided by the source application instance for the user equipment; and when the current service quality does not meet a service quality requirement of the user equipment, determine that the user equipment needs to perform mobile edge platform switching.

Optionally, the information about the source application instance is an Internet Protocol IP address of the source application instance, and the information about the user equipment is an IP address of the user equipment.

Optionally, the apparatus further includes:

a second receiving unit, configured to: after the switching notification message is sent to the target application instance, receive a switching notification response message sent by the target application instance; and an updating unit, configured to update a route rule of the user equipment based on the switching notification response message, so that the uplink data packet of the user equipment is routed to the target application instance.

Optionally, the apparatus further includes:

a third sending unit, configured to: after the route rule of the user equipment is updated based on the switching notification response message, send a route rule update indication message to the first mobile edge platform, where the route rule update indication message is used to instruct the first mobile edge platform to delete a route rule of the user equipment stored by the first mobile edge platform.

It should be understood that the apparatus 400 herein is embodied in a form of a functional unit. The term "unit" herein may be an application-specific integrated circuit (Application-Specific Integrated Circuit, ASIC), an electronic circuit, a processor (such as a shared processor, a dedicated processor, or a group processor) for executing one or more software or firmware programs, a memory, a merged logic circuit, and/or another appropriate component supporting the described functions. In an optional example, a person skilled in the art may understand that the apparatus 400 may be specifically the second mobile edge platform in the foregoing embodiment, and the apparatus 400 may be configured to perform procedures and/or steps corresponding to the second mobile edge platform in the foregoing method embodiment. To avoid repetition, details are not described herein again.

FIG. 7 shows a mobile edge platform switching apparatus 500 according to an embodiment of the present disclosure. The apparatus 500 includes:

a first determining unit 510, configured to determine an application identity of a source application instance, where the mobile edge platform switching apparatus provides a service for the source application instance; and a first sending unit 520, configured to send the application identity determined by the first determining unit to a second mobile edge platform, where the application identity is used by the second mobile edge platform to determine a target application instance, and the second mobile edge platform provides a service for the target application instance.

Optionally, the apparatus further includes:

a second determining unit, configured to: before the application identity is determined, determine that user equipment needs to perform mobile edge platform switching.

The first sending unit is specifically configured to send a switching request message to the second mobile edge platform, where the switching request message carries the application identity.

Optionally, the apparatus further includes:

an obtaining unit, configured to obtain an uplink data packet of the user equipment.

The second determining unit is specifically configured to: if the uplink data packet is forwarded by the second mobile edge platform, determine that the user equipment needs to perform mobile edge platform switching.

Optionally, the apparatus further includes:

an obtaining unit, configured to obtain an uplink data packet of the user equipment; and if the uplink data packet is forwarded by the second mobile edge platform, obtain information about the user equipment from the uplink data packet.

The second determining unit is specifically configured to determine, based on the information about the user equipment, current service quality of the service provided by the source application instance for the user equipment; and when the current service quality does not meet a service quality requirement of the user equipment, determine that the user equipment needs to perform mobile edge platform switching.

Optionally, the apparatus further includes:

a first receiving unit, configured to: before the application identity of the source application instance is determined, receive a switching trigger message sent by the second mobile edge platform, where the switching trigger message carries information about the source application instance.

The first determining unit is specifically configured to:

determine the application identity based on the switching trigger message.

Optionally, the information about the source application instance is an IP address of the source application instance.

Optionally, the apparatus further includes:

a deletion unit, configured to: after the application identity is sent to the second mobile edge platform, delete a route rule of the user equipment stored by the apparatus.

Optionally, the apparatus further includes:

a second receiving unit, configured to receive a route rule update indication message sent by the second mobile edge platform or the source application instance.

The deletion unit is specifically configured to:

delete, based on the route rule update indication message, the route rule of the user equipment stored by the apparatus.

It should be understood that the apparatus 500 herein is embodied in a form of a functional unit. The term "unit" herein may be an application-specific integrated circuit (ASIC), an electronic circuit, a processor (such as a shared processor, a dedicated processor, or a group processor) for executing one or more software or firmware programs, a memory, a merged logic circuit, and/or another appropriate component supporting the described functions. In an optional example, a person skilled in the art may understand that the apparatus 500 may be specifically the first mobile edge platform in the foregoing embodiment, and the apparatus 500 may be configured to perform procedures and/or steps corresponding to the first mobile edge platform in the foregoing method embodiment. To avoid repetition, details are not described herein again.

FIG. 8 shows a mobile edge platform switching apparatus 600 according to an embodiment of the present disclosure. The apparatus 600 includes:

a receiving unit 610, configured to receive a switching notification message sent by a second mobile edge platform, where the switching notification message is used to notify the mobile edge platform switching apparatus that user equipment needs to switch to the second mobile edge platform, the mobile edge platform switching apparatus provides a service for the user equipment, and the second mobile edge platform provides a service for the mobile edge platform switching apparatus; and a sending unit 620, configured to send a synchronization request message to a source application instance based on the switching notification message, where the synchronization request message is used to request the source application instance to send context information of the user equipment to the apparatus.

Optionally, the switching notification message includes information about the source application instance and information about the user equipment.

Optionally, the information about the source application instance is an IP address of the source application instance, and the information about the user equipment is an IP address of the user equipment.

Optionally, the apparatus further includes:

a sending unit, configured to: after the apparatus synchronizes the context information of the user equipment with the source application instance based on the switching notification message, send a switching notification response message to the second mobile edge platform, where the switching notification response message is used to indicate that the target application instance and the source application instance successfully synchronize the context information of the user equipment.

It should be understood that the apparatus 600 herein is embodied in a form of a functional unit. The term "unit" herein may be an ASIC, an electronic circuit, a processor (such as a shared processor, a dedicated processor, or a group processor) for executing one or more software or firmware programs, a memory, a merged logic circuit, and/or another appropriate component supporting the described functions. In an optional example, a person skilled in the art may understand that, the apparatus 600 may be specifically the target application instance in the foregoing embodiment. More specifically, the apparatus 600 may be a virtual machine corresponding to the target application instance. The apparatus 600 may be configured to perform procedures and/or steps corresponding to the target application instance in the foregoing embodiment. To avoid repetition, details are not described herein again.

Figure 9:
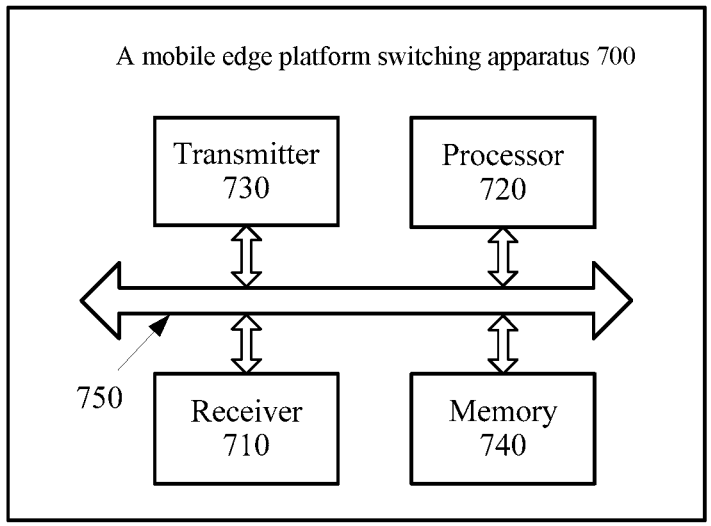
FIG. 9 is a schematic block diagram of another mobile edge platform switching apparatus according to an embodiment of the present disclosure.

FIG. 9 shows a mobile edge platform switching apparatus 700 according to an embodiment of the present disclosure. The apparatus 700 includes a receiver 710, a processor 720, a transmitter 730, a memory 740, and a bus system 750. The receiver 710, the processor 720, the transmitter 730, and the memory 740 are connected by using the bus system 750. The memory 740 is configured to store an instruction. The processor 720 is configured to execute the instruction stored in the memory 740, to control the receiver 710 to receive a signal and control the transmitter 730 to send a signal.

The receiver 710 is configured to receive an application identity sent by a first mobile edge platform, where the first mobile edge platform provides a service for a source application instance.

The processor 720 is configured to determine a target application instance based on the application identity received by the receiver 710, where the mobile edge platform switching apparatus provides a service for the target application instance.

The transmitter 730 is configured to send a switching notification message to the target application instance determined by the processor 720, where the switching notification message is used to notify the target application instance that user equipment needs to switch to the apparatus, and the target application instance provides a service for the user equipment.

Optionally, the switching notification message includes information about the source application instance and information about the user equipment.

Optionally, the receiver 710 is specifically configured to receive a switching request message sent by the first mobile edge platform, where the switching request message carries the application identity.

Optionally, the processor 720 is further configured to: before the application identity sent by the first mobile edge platform is received, determine that the user equipment needs to perform mobile edge platform switching. The transmitter 730 is further configured to send a switching trigger message to the first mobile edge platform, where the switching trigger message carries the information about the source application instance. The receiver 710 is specifically configured to receive the application identity sent by the first mobile edge platform based on the switching trigger message.

Optionally, the processor 720 is specifically configured to: obtain an uplink data packet of the user equipment; and if the uplink data packet is sent to the source application instance by the user equipment, determine that the user equipment needs to perform mobile edge platform switching.

Optionally, the processor 720 is specifically configured to: obtain an uplink data packet of the user equipment; if the uplink data packet is sent to the source application instance by the user equipment, obtain the information about the user equipment from the uplink data packet; determine, based on the information about the user equipment, current service quality of the service provided by the source application instance for the user equipment; and when the current service quality does not meet a service quality requirement of the user equipment, determine that the user equipment needs to perform mobile edge platform switching.

Optionally, the information about the source application instance is an Internet Protocol IP address of the source application instance, and the information about the user equipment is an IP address of the user equipment.

Optionally, the receiver 710 is further configured to: after the switching notification message is sent to the target application instance, receive a switching notification response message sent by the target application instance. The processor 720 is further configured to update a route rule of the user equipment based on the switching notification response message, so that the uplink data packet of the user equipment is routed to the target application instance.

Optionally, the transmitter 730 is further configured to: after the route rule of the user equipment is updated based on the switching notification response message, send a route rule update indication message to the first mobile edge platform, where the route rule update indication message is used to instruct the first mobile edge platform to delete a route rule of the user equipment stored by the first mobile edge platform.

It should be understood that the apparatus 700 may be specifically the second mobile edge platform in the foregoing embodiment, and may be configured to perform steps and/or procedures corresponding to the second mobile edge platform in the foregoing method embodiment. Optionally, the memory 740 may include a read-only memory and a random access memory, and provide an instruction and data for the processor. A part of the memory may further include a non-volatile random access memory. For example, the memory may further store device type information. The processor 720 may be configured to execute the instruction stored in the memory. When the processor executes the instruction, the processor may perform the steps and/or the procedures corresponding to the second mobile edge platform in the foregoing method embodiment.

Figure 10:
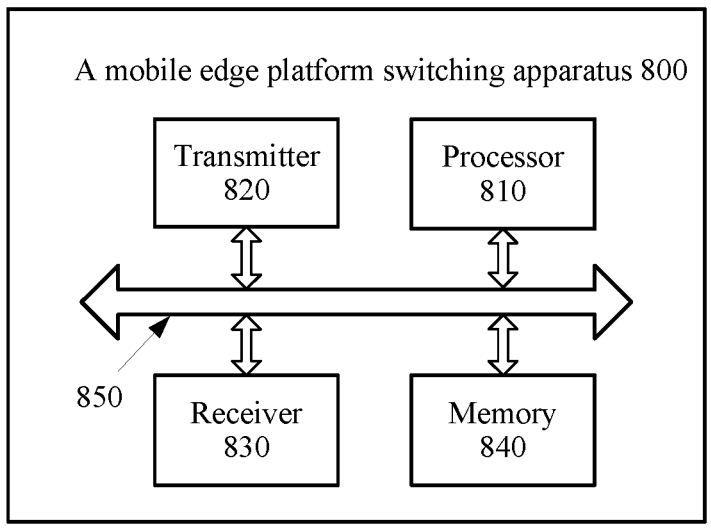
FIG. 10 is a schematic block diagram of another mobile edge platform switching apparatus according to an embodiment of the present disclosure.

FIG. 10 is a mobile edge platform switching apparatus 800 according to an embodiment of the present disclosure. The apparatus 800 includes a processor 810, a transmitter 820, a receiver 830, a memory 840, and a bus system 850. The processor 810, the transmitter 820, the receiver 830, and the memory 840 are connected by using the bus system 850. The memory 840 is configured to store an instruction. The processor 810 is configured to execute the instruction stored in the memory 840, to control the transmitter 820 to send a signal and control the receiver 830 to receive a signal.

The processor 810 is configured to determine an application identity of a source application instance, where the mobile edge platform switching apparatus provides a service for the source application instance.

The transmitter 820 is configured to send the application identity determined by the processor 810 to a second mobile edge platform, where the application identity is used by the second mobile edge platform to determine a target application instance, and the second mobile edge platform provides a service for the target application instance.

Optionally, the processor 810 is further configured to: before determining the application identity, determine that the user equipment needs to perform mobile edge platform switching. The transmitter 820 is specifically configured to send a switching request message to the second mobile edge platform, where the switching request message carries the application identity.

Optionally, the processor 810 is specifically configured to: obtain an uplink data packet of the user equipment; and if the uplink data packet is forwarded by the second mobile edge platform, determine that the user equipment needs to perform mobile edge platform switching.

Optionally, the processor 810 is specifically configured to: obtain an uplink data packet of the user equipment; if the uplink data packet is forwarded by the second mobile edge platform, obtain information about the user equipment from the uplink data packet; determine, based on the information about the user equipment, current service quality of the service provided by the source application instance for the user equipment; and when the current service quality does not meet a service quality requirement of the user equipment, determine that the user equipment needs to perform mobile edge platform switching.

Optionally, the receiver 830 is configured to: before the application identity of the source application instance is determined, receive a switching trigger message sent by the second mobile edge platform, where the switching trigger message carries information about the source application instance. The processor 810 is specifically configured to determine the application identity based on the switching trigger message.

Optionally, the information about the source application instance is an IP address of the source application instance.

Optionally, the processor 810 is further configured to: after the application identity is sent to the second mobile edge platform, delete a route rule of the user equipment stored by the apparatus.

Optionally, the processor 810 is further configured to receive a route rule update indication message sent by the second mobile edge platform or the source application instance. The processor 810 is specifically configured to delete, based on the route rule update indication message, the route rule of the user equipment stored by the apparatus.

It should be understood that the apparatus 800 may be specifically the first mobile edge platform in the foregoing embodiment, and may be configured to perform steps and/or procedures corresponding to the first mobile edge platform in the foregoing method embodiment. Optionally, the memory 840 may include a read-only memory and a random access memory, and provide an instruction and data for the processor. A part of the memory may further include a non-volatile random access memory. For example, the memory may further store device type information. The processor 810 may be configured to execute the instruction stored in the memory. When the processor executes the instruction stored in the memory, the processor is configured to perform the steps and/or the procedures in the foregoing method embodiment.

Figure 11:
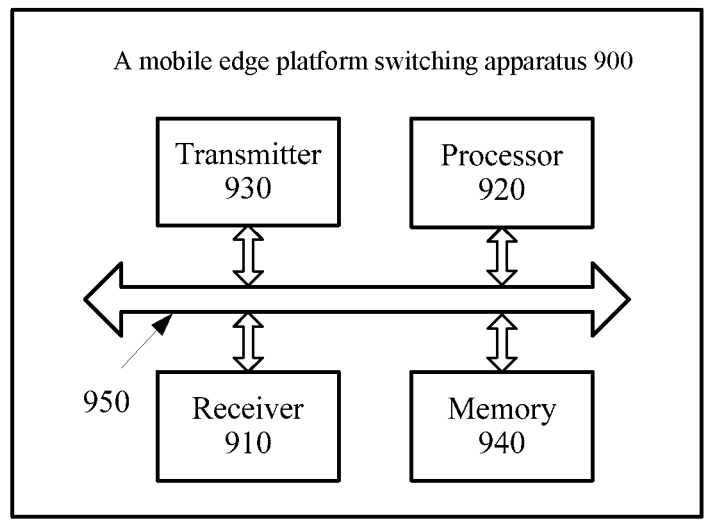
FIG. 11 is a schematic block diagram of another mobile edge platform switching apparatus according to an embodiment of the present disclosure.
Figure 12:
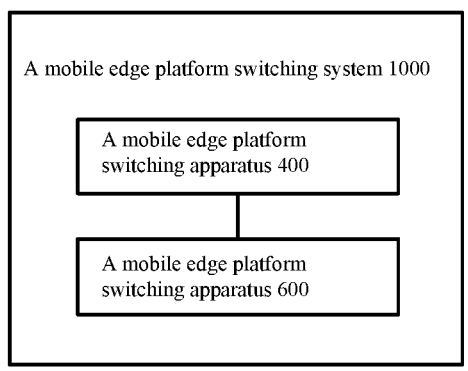
FIG. 12 is a schematic block diagram of a mobile edge platform switching system according to an embodiment of the present disclosure.

FIG. 11 is a mobile edge platform switching apparatus 900 according to an embodiment of the present disclosure. The apparatus 900 includes a receiver 910, a processor 920, a transmitter 930, a memory 940, and a bus system 950. The receiver 910, the processor 920, the transmitter 930, and the memory 940 are connected by using the bus system 950. The memory 940 is configured to store an instruction. The processor 920 is configured to execute the instruction stored in the memory 940, to control the transmitter 930 to send a signal and control the receiver 910 to receive a signal.

The receiver 910 is configured to receive a switching notification message sent by a second mobile edge platform, where the switching notification message is used to instruct the mobile edge platform switching apparatus to provide a service for user equipment, the second mobile edge platform provides a service for the mobile edge platform switching apparatus, and the second mobile edge platform provides a service for the target application instance.

The transmitter 930 is configured to send a synchronization request message to a source application instance based on the switching notification message, where the synchronization request message is used to request the source application instance to send context information of the user equipment to the target application instance.

Optionally, the switching notification message includes information about the source application instance and information about the user equipment.

Optionally, the information about the source application instance is an IP address of the source application instance, and the information about the user equipment is an IP address of the user equipment.

Optionally, the transmitter 930 is configured to: after the apparatus synchronizes the context information of the user equipment with the source application instance based on the switching notification message, send a switching notification response message to the second mobile edge platform, where the switching notification response message is used to indicate that the target application instance and the source application instance successfully synchronize the context information of the user equipment.

It should be understood that the apparatus 900 may be specifically the target application instance in the foregoing embodiment, and may be configured to perform steps and/or procedures corresponding to the target application instance in the foregoing method embodiment. Optionally, the memory 940 may include a read-only memory and a random access memory, and provide an instruction and data for the processor. A part of the memory may further include a non-volatile random access memory. For example, the memory may further store device type information. The processor 920 may be configured to execute the instruction stored in the memory. When the processor executes the instruction stored in the memory, the processor is configured to perform the steps and/or the procedures in the foregoing method embodiment.

It should be understood that, in this embodiment of the present disclosure, the processor may be a central processing unit (CPU), or the processor may be another general-purpose processor, a digital signal processor (DSP), an ASIC, a field programmable gate array (FPGA), another programmable logic device, a discrete gate, a transistor logic device, a discrete hardware component, or the like. The general-purpose processor may be a microprocessor, or the processor may be any conventional processor or the like.

In an implementation process, the steps in the foregoing methods may be implemented by using a hardware integrated logic circuit in the processor, or by using an instruction in a form of software. The steps of the methods disclosed with reference to the embodiments of the present disclosure may be directly implemented by using a hardware processor, or may be implemented by using a combination of hardware and a software module in the processor. The software module may be located in a mature storage medium such as a random access memory, a flash memory, a read-only memory, a programmable read-only memory, an erasable programmable memory, or a register in the art. The storage medium is located in the memory, and the processor executes the instruction in the memory to perform the steps of the methods in combination with hardware in the processor. To avoid repetition, details are not described herein again.

In addition, a mobile edge platform switching system 1000 in an embodiment of the present disclosure may include the mobile edge platform switching apparatus 400 and the mobile edge platform switching apparatus 600. In an optional example, a person skilled in the art may understand that the system 1000 may be specifically a mobile edge computing server, the apparatus 400 may be configured to perform procedures and/or steps corresponding to the second mobile edge platform in the foregoing method embodiment, and the apparatus 600 may be configured to perform procedures and/or steps corresponding to the target application instance in the foregoing method embodiment. To avoid repetition, details are not described herein again.

A person of ordinary skill in the art may be aware that, in combination with the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are executed by hardware or software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for ease of convenience and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual requirements to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present disclosure essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A mobile edge platform switching method, comprising:
receiving, by a second mobile edge platform, an application identity of a source application instance from a first mobile edge platform, wherein the first mobile edge platform provides a service for the source application instance, and wherein the source application instance provides a service for a user equipment, wherein before the receiving, by the second mobile edge platform, the application identity of the source application instance from the first mobile edge platform, the method further comprises:
determining, by the second mobile edge platform, that the user equipment needs to perform mobile edge platform switching, wherein determining that the user equipment needs to perform the mobile edge platform switching comprises:
obtaining, by the second mobile edge platform, an uplink data packet of a user equipment; and
when the uplink data packet is sent to a source application instance by the user equipment:
obtaining, by the second mobile edge platform, information about the user equipment from the uplink data packet;
determining, by the second mobile edge platform and based on the information about the user equipment, current service quality of the service provided by the source application instance for the user equipment; and
when the current service quality does not meet a service quality requirement of the user equipment, determining, by the second mobile edge platform, that the user equipment needs to perform the mobile edge platform switching; and
sending, by the second mobile edge platform, a switching trigger message to the first mobile edge platform, wherein the switching trigger message carries information about the source application instance; and
wherein the receiving, by the second mobile edge platform, the application identity comprises receiving, by the second mobile edge platform, the application identity from the first mobile edge platform based on the switching trigger message;
determining, by the second mobile edge platform, a target application instance of the user equipment based on the application identity of the source application instance, wherein the application identity of the source application instance is the same as an application identity of the target application instance, wherein the source application instance and the target application instance are two different copies of a same application and are deployed on two different virtual machines, wherein the same application identity of the source application instance and the target application instance uniquely identifies the application, and wherein the second mobile edge platform provides the service for the target application instance; and
sending, by the second mobile edge platform, a switching notification message to the target application instance, wherein the switching notification message is used to instruct the target application instance to provide the service for the user equipment, wherein the source application instance and the target application instance provide the same service for the user equipment.

2. The method according to claim 1, wherein the determining, by the second mobile edge platform, that the user equipment needs to perform the mobile edge platform switching comprises:
obtaining, by the second mobile edge platform, the uplink data packet of the user equipment; and
when the uplink data packet is sent to the source application instance by the user equipment, determining, by the second mobile edge platform, that the user equipment needs to perform the mobile edge platform switching.

3. The method according to claim 1, wherein the receiving, by the second mobile edge platform, the application identity from the first mobile edge platform comprises:
receiving, by the second mobile edge platform, a switching request message from the first mobile edge platform, wherein the switching request message carries the application identity.

4. The method according to claim 1, wherein after the sending, by the second mobile edge platform, the switching notification message to the target application instance, the method further comprises:
receiving, by the second mobile edge platform, a switching notification response message from the target application instance; and
updating, by the second mobile edge platform, a route rule of the user equipment based on the switching notification response message.

5. A mobile edge platform switching method, comprising:
obtaining, by a first mobile edge platform, an uplink data packet of a user equipment; and
when the uplink data packet is forwarded by a second mobile edge platform:
obtaining, by the first mobile edge platform, information about the user equipment from the uplink data packet;
determining, by the first mobile edge platform and based on the information about the user equipment, current service quality of a service provided by a source application instance for the user equipment; and
when the current service quality does not meet a service quality requirement of the user equipment, determining, by the first mobile edge platform, that the user equipment needs to perform mobile edge platform switching;
determining, by the first mobile edge platform, an application identity of the source application instance of the user equipment, wherein the first mobile edge platform provides the service for the source application instance, and wherein the source application instance provides the service for the user equipment; and
sending, by the first mobile edge platform, the application identity to the second mobile edge platform comprises:
sending, by the first mobile edge platform, a switching request message to the second mobile edge platform, wherein the switching request message carries the application identity, wherein the application identity is used by the second mobile edge platform to determine a target application instance of the user equipment, wherein the source application instance and the target application instance are two different copies of a same application and are deployed on two different virtual machines, wherein the source application instance and the target application instance have the same application identity uniquely identifying the application, and wherein the second mobile edge platform provides the service for the target application instance.

6. The method according to claim 5, wherein the determining, by the first mobile edge platform, that the user equipment needs to perform the mobile edge platform switching comprises:
obtaining, by the first mobile edge platform, the uplink data packet of the user equipment; and
when the uplink data packet is forwarded by the second mobile edge platform, determining, by the first mobile edge platform, that the user equipment needs to perform the mobile edge platform switching.

7. The method according to claim 5, wherein before the determining, by the first mobile edge platform, the application identity, the method further comprises:
receiving, by the first mobile edge platform, a switching trigger message from the second mobile edge platform, wherein the switching trigger message carries information about the source application instance; and
wherein the determining, by the first mobile edge platform, the application identity comprises:
determining, by the first mobile edge platform, the application identity based on the switching trigger message.

8. A mobile edge platform switching method, comprising:
obtaining, by a mobile edge platform, an uplink data packet of a user equipment:
obtaining, by the mobile edge platform, information about the user equipment from the uplink data packet;
determining, by the mobile edge platform and based on the information about the user equipment, current service quality of a service provided by a source application instance for the user equipment; and
when the current service quality does not meet a service quality requirement of the user equipment, determining, by the mobile edge platform, that the user equipment needs to perform mobile edge platform switching;
receiving, by a target application instance, a switching notification message from the mobile edge platform, wherein the switching notification message is used to instruct the target application instance to provide the service for the user equipment, and the mobile edge platform provides the service for the target application instance; and
sending, by the target application instance, a synchronization request message to the source application instance based on the switching notification message, wherein the synchronization request message is used to request the source application instance to send context information of the user equipment to the target application instance, wherein the source application instance and the target application instance are two different copies of a same application and are deployed on two different virtual machines, and wherein the source application instance and the target application instance have the same application identity uniquely identifying the application.

9. The method according to claim 8, wherein after the target application instance synchronizing the context information of the user equipment with the source application instance based on the switching notification message, the method further comprises:
sending, by the target application instance, a switching notification response message to the mobile edge platform, wherein the switching notification response message is used to indicate that the target application instance and the source application instance successfully synchronize the context information of the user equipment.

* * * * *